Oct. 28, 1941.    G. CARLSON    2,260,829

BOX SUPPORTING DEVICE

Filed Nov. 30, 1939

Inventor:
George Carlson,
by Harry E. Dunham
His Attorney.

Patented Oct. 28, 1941

2,260,829

UNITED STATES PATENT OFFICE 2,260,829

BOX SUPPORTING DEVICE

George Carlson, Bridgeport, Conn., assignor to General Electric Company, a corporation of New York Application November 30, 1939, Serial No. 306,909

3 Claims. (Cl. 174—63)

My invention relates to box-supporting devices, and more particularly to a stud assembly for mounting an electrical outlet box, or the like, on a bar hanger for use in house wiring.

In the installation of house wiring systems it is customary to provide a number of outlet boxes which receive the terminals of the various wires, and which provide a supporting means for electrical fixtures. The outlet box is frequently mounted in position by means of a bar hanger fastened to the framing of the house. In such cases a stud is employed to secure the box to the hanger; the stud also has a portion extending within the outlet box for engagement with the supporting means of electric fixtures. In order to permit adjustment of the outlet box, it is mounted so that it may be moved along the bar hanger. Usually, the supporting stud is slidably mounted on the bar hanger and is secured in position by means of a lock screw inserted through the stud and engaging the bar hanger. Then, the outlet box is mounted on the stud, by a separate means which consists of a nut threaded around the shank of the stud to lock the outlet box in position. This means that two separate locking means and two separate adjustments are necessary to correctly position the stud on the bar hanger and to hold the outlet box in position. According to my invention, however, only a single locking means is necessary to accomplish both these purposes.

It is an object of my invention to provide an improved and simplified form of supporting device for adjustably securing an outlet box to a bar hanger in which a single adjustment accomplishes the dual purpose of mounting the stud in position on the hanger and securing the outlet box to the stud.

It is a further object of my invention to provide a box supporting device which comprises relatively few parts, such that it may be manufactured at low cost, and which may be quickly and easily installed in position.

Figure 1:
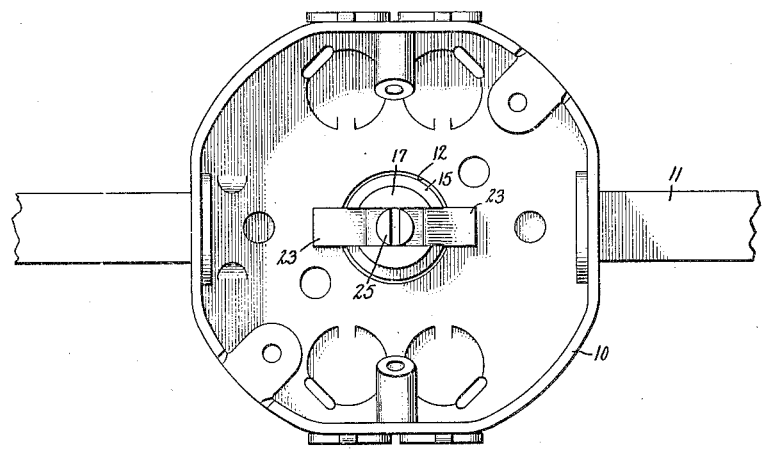
Figure 2:
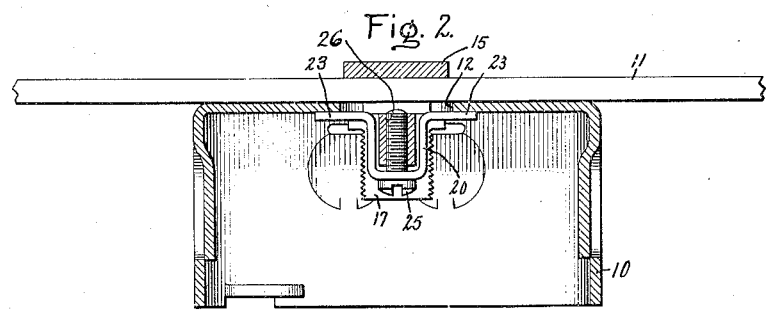

In the accompanying drawing, Fig. 1 is a plan view of the interior of an outlet box showing my box-supporting device in position; Fig. 2 is a sectional view through an outlet box and the box-supporting device showing these elements in position on a bar hanger; and Fig. 3 is an exploded view of the elements of my supporting device.

Referring to the drawing I have shown my box-supporting device mounting an outlet box 10 on a supporting strap 11, such as a bar hanger. The outlet box 10 is provided with a centrally disposed opening 12 in the bottom wall of the box through which the box-supporting device extends for securing the outlet box in position on the hanger. In some cases the opening 12 may be formed by a knock-out.

Figure 3:
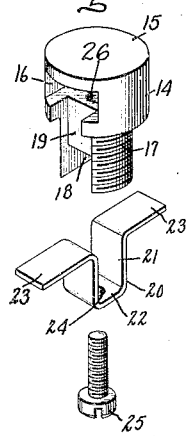

Referring more particularly to Fig. 3, my box-supporting device comprises a stud 14 of generally cylindrical form having an enlarged head 15 at one end provided with a transverse opening 16 and having a narrower screw-threaded portion 17 at the other end. The outer end of the threaded shank portion of the stud is provided with a transverse slot 18 and the opposite sides of the shank are formed with longitudinal grooves 19 which extend from the transverse slot 18 to the transverse opening 16. Associated with the slotted stud is a clamping member 20 of U-shaped form having arms 21 extending on each side of a central portion 22 and being provided with ears 23 which extend outwardly from the ends of the arms 21. The central flat portion 22 is formed with an opening 24 to receive an adjusting or locking screw 25. In assembled position, the U-shaped clamping member rests within the slotted shank portion of the stud with the ears 23 extending beyond the confines thereof. In this position the flat portion 22 rests within the transverse slot 18 while the arms 21 are disposed within the longitudinal grooves 19. To hold the clamping member in position, the screw 25 is threaded into a tapped opening 26 formed in the central solid portion of the mounting stud which is located between the grooves 19 and also between the slot 18 and the opening 16.

In order to support the outlet box on the bar hanger, the hanger is inserted through the transverse opening 16 which is made of a size to accommodate the bar hanger with which it is to be used. After assembly of these elements the threaded shank of the mounting stud is inserted through the opening 12 in the bottom wall of the outlet box, so that it extends within the interior of the outlet box. Thereafter, the clamping member 20 is inserted in position in the manner aforesaid and the locking screw 25 threaded down into the position shown by Fig. 2. It will be apparent that as the locking screw 25 is threaded down on the clamping member, the ears 23 will engage the inner wall of the outlet box and draw the headed end of the stud and the bar hanger securely into engagement with the outer face of the outlet box. This means that the wall of the outlet box is securely clamped between the bar hanger 11 and the ears 23. At the same time, the head of the stud is held firmly in position on the bar hanger and cannot be moved transversely thereof due to the clamping action of the member 20.

An alternative method of mounting the outlet box is to insert the assembled stud and clamping member through the opening 12 from the interior of the box and thereafter slip the bar hanger through the stud. This is made possible due to the fact that the head 15 of the stud is made smaller than the opening 12 in the wall of the outlet box.

By my construction the manner of mounting the outlet box and adjusting the stud on the hanger has been greatly simplified due to the fact that but a single tool, such as a screwdriver, is needed to secure both the outlet box and the stud in position on the hanger; in former constructions it was necessary to provide a lock nut to hold the outlet box on the stud in addition to a central locking screw which held the stud in position on the hanger. Inasmuch as the arms 21 of the clamping member are located within the grooves 19 below the circumference of the threaded shank 17, it is possible to thread a nipple or other electric fixture supporting device onto the threaded shank of the stud in the customary way. Since the clamping member is so shaped as to fit within the confines of the slotted stud, the space within the outlet box taken up by the supporting device has been reduced, thereby increasing the space available for wiring. Since all adjustments of the box and stud are performed by means of a screwdriver, it is easy to make such adjustments when the box is filled with wiring assemblies simply by inserting a screwdriver into the interior of the box and engaging the locking screw 25; it is unnecessary to remove part of the wiring assembly.

What I claim as new and desire to secure by Letters Patent of the United States, is:

1. In a support for mounting an outlet box on a bar hanger, a stud having means at one end for receiving the bar hanger and a screw-threaded portion at the other end, said stud passing through an opening in the wall of the outlet box with the bar hanger being located on one side of the wall and the threaded end of the stud on the other, the threaded end of the stud being provided with a slot therein separated from the bar hanger receiving means by a solid portion, a clamping member mounted on the threaded end of the stud, said member being so shaped as to fit within the confines of said slot and having portions extending beyond the confines thereof for engaging the said other side of the wall of the outlet box, and a screw mounted in the solid portion of the threaded end of the stud within the slot and engaging the clamping member and being adapted to draw the clamping member into engagement with the said other wall of the box to secure the wall of the outlet box between the bar hanger and the clamping member and to retain the stud in position on the bar hanger.

2. In a support for mounting an outlet box on a bar hanger, a stud having an opening at one end for receiving the bar hanger, a portion of the walls of the stud forming said opening overhanging the bar to prevent movement of the stud transversely of the hanger while permitting free movement of the stud longitudinally along the hanger, said stud having a screw-threaded portion at the other end for receiving a nipple of an electric fixture, said stud being insertable through an opening in the wall of the outlet box with the bar hanger and open end of the stud being located on one side of the wall and the threaded end of the stud on the other, the threaded end of the stud being provided with a transverse slot spaced from said opening by a solid portion, a U-shaped member in said slot within the confines of said stud extending around the solid portion and having ears extending beyond the confines of said stud and engaging the said other side of the wall and a screw threaded into the solid portion of said stud and engaging said U-shaped member to clamp the wall of the outlet box between the bar hanger and said ears.

3. In a support for mounting an outlet box on a bar hanger, a stud having a transverse opening at one end for receiving the bar hanger, a portion of the walls of the stud forming said opening overhanging the bar to prevent movement of the stud transversely of the hanger while permitting free movement of the stud longitudinally along the hanger, said stud having a screw-threaded portion at the other end for receiving a nipple of an electric fixture, said stud being insertable through an opening in the wall of the outlet box with the bar hanger and open end of the stud being located on one side of the wall and the threaded end of the stud on the other, the threaded end of the stud being provided with a transverse slot at the end, and opposed longitudinal grooves extending from said slot to said opening and being separated by a centrally located solid portion, a U-shaped member in said slot having arms disposed in said longitudinal grooves within the confines of said stud, the arms of the U-shaped member having ears extending beyond the confines of said stud and engaging the said other side of the wall, and a screw located in said transverse slot threaded into the center solid portion of said stud and engaging said U-shaped member whereby the wall of the outlet box may be clamped between the bar hanger and said ears.

GEORGE CARLSON.